United States Patent
Zawadzki et al.

(10) Patent No.: US 11,813,977 B1
(45) Date of Patent: Nov. 14, 2023

(54) SAFETY SYSTEM FOR MOTOR VEHICLES HAVING POWER TAKE OFF DRIVE

(71) Applicant: DEL Hydraulics, Inc., Buffalo, NY (US)

(72) Inventors: Mark Zdzislaw Zawadzki, Lancaster, NY (US); Paul Henry Martin, Toronto (CA); Matthew Jacob Czerniejewski, Cheektowaga, NY (US)

(73) Assignee: DEL Hydraulics, Inc., Buffalo, NY (US)

( * ) Notice: Subject to any disclaimer, the term of this patent is extended or adjusted under 35 U.S.C. 154(b) by 96 days.

(21) Appl. No.: 17/727,198

(22) Filed: Apr. 22, 2022

(51) Int. Cl.
| | |
|---|---|
| *B60Q 1/46* | (2006.01) |
| *F21S 10/06* | (2006.01) |
| *H05B 47/17* | (2020.01) |
| *F21W 103/30* | (2018.01) |
| *B60K 25/06* | (2006.01) |

(52) U.S. Cl.
CPC ............... *B60Q 1/46* (2013.01); *F21S 10/06* (2013.01); *H05B 47/17* (2020.01); *B60K 25/06* (2013.01); *F21W 2103/30* (2018.01)

(58) Field of Classification Search
CPC .......... B60Q 1/46; H05B 47/17; F21S 10/06; F21W 2103/30; B60K 25/06
See application file for complete search history.

(56) References Cited

U.S. PATENT DOCUMENTS

| | | | |
|---|---|---|---|
| 4,825,190 A | 4/1989 | Martin | |
| 5,677,671 A * | 10/1997 | Pabla | B60Q 1/46 340/471 |
| 9,404,545 B2 | 8/2016 | Bohn et al. | |
| 10,549,634 B1 | 2/2020 | Vittatoe | |

FOREIGN PATENT DOCUMENTS

| | | | | |
|---|---|---|---|---|
| DE | 102016006198 A1 * | 11/2017 | ............. | B62D 33/06 |
| EP | 0696524 A1 * | 2/1996 | ............. | B60K 25/00 |
| EP | 3766718 A1 * | 1/2021 | ............. | B60K 28/16 |
| GB | 2 337 733 A | 12/1999 | | |
| GB | 2 395 051 A | 5/2004 | | |
| GB | 2 407 680 A | 5/2005 | | |
| WO | WO 99/61278 | 12/1999 | | |

* cited by examiner

*Primary Examiner* — Faye M Fleming
(74) *Attorney, Agent, or Firm* — Barclay Damon LLP

(57) ABSTRACT

A safety system for a motor vehicle equipped with a power take-off (PTO) drive assembly includes an electrical circuit coupled to a hazard warning system of the motor vehicle. The hazard warning system includes at least one flasher lamp electrically powered by a battery of the motor vehicle and a control switch for activating and deactivating the at least one flasher lamp. The electrical circuit includes an electrical relay coupled to the actuating or control element in which the electrical relay is triggered only when the flasher lamp(s) are energized. In one version, the control or actuating element is an air solenoid operatively coupled to the electrical relay and further disposed relative to an air line between the cab control and an air shifter of the PTO drive assembly.

18 Claims, 2 Drawing Sheets

SAFETY SYSTEM FOR MOTOR VEHICLES HAVING POWER TAKE OFF DRIVE

TECHNICAL FIELD

This application generally relates to commercial motor vehicles, such as trucks, vans, and the like that are equipped with power take off (PTO) drive systems or assemblies (e.g., engine, transmission, electric motor, battery, hydraulic, water, gaseous, oil) for purposes of driving auxiliary equipment carried by the motor vehicle. More specifically, this application is directed to a safety system that prevents unauthorized use or operation of the PTO drive system/assembly of a commercial motor vehicle unless the hazard warning lights are energized.

BACKGROUND

Commercial motor vehicles, such as trucks, vans and tractors, in particular, often include power take-off (PTO) drive assemblies, which are used in order to transfer the power of the vehicle's engine to one or more auxiliary components, e.g., a hydraulic pump. Examples of known PTO drive systems are described in U.S. Pat. Nos. 9,404,545 and 10,549,634. In use, hydraulic flow generated by the pump is directed to cylinders and/or hydraulic motors to perform work, such as, for example, operating a dump bed, refuse collector, or snow removal blade. In at least some applications, the PTO drive system provides power in the form of a rotating power take-off shaft, which can be used for vacuum pumps, hydraulic pumps, liquid transfer pumps, pneumatic blowers and other apparatus that are directly to the driven component carried on the motor vehicle.

Typically, a PTO drive assembly may be engaged through various means from controls located in the cab of the motor vehicle. These means may include air pressure, manual, cable, electric solenoid, battery (in the case of electrically powered trucks) or hydraulic air pressure from controls located in the cab of the motor vehicle. A recurring issue identified in the field is in being able to provide sufficient failsafes and adequate safety measures for motor vehicles that are equipped with PTO drive systems or assemblies to prevent unauthorized use. For example, a dump truck may have its dump bed raised or open while passing under a bridge or other existing structure. Therefore, a prevailing need exists to tend to this issue.

BRIEF DESCRIPTION

Therefore and according to at least one aspect of the present invention, there is provided a safety system for a motor vehicle equipped with a power take-off (PTO) drive assembly and a hazard warning system including at least one flasher lamp powered by a battery of the motor vehicle. The safety system comprises an electrical circuit coupling the hazard warning system and an control element of the PTO drive assembly, wherein the control element is disconnected from the PTO drive assembly to prevent operation of the PTO drive assembly unless the at least one flasher lamp is energized.

In at least one embodiment, the electrical circuit includes an electrical relay that is triggered only upon receipt of a power signal from the at least one flasher lamp when the lamp(s) is energized. The electrical relay is also coupled to the control element of the PTO drive assembly wherein operation of the control element is prevented unless the electrical relay is triggered. According to one version, the control element is an air solenoid disposed in an pneumatic line, such as between the cab controls and an air shifter of the PTO drive assembly.

According to at least one embodiment, a switch assembly retains the electrical relay, which is further coupled to a capacitor and diode that are configured to smooth out an intermittent power signal from the hazard warning system. In at least one version, the air solenoid is integral to a housing of the switch assembly. According to another embodiment, the air solenoid is separately disposed as part of the safety system.

According to another aspect of the present invention, there is provided a switch assembly configured for connection to an actuating element of a power take-off (PTO) drive assembly of a commercial motor vehicle, the switch assembly being coupled to a hazard warning system of the motor vehicle having at least one flasher lamp, wherein the switch assembly comprises an electrical relay that is triggered by the receipt of an intermittent power signal indicative of an active engaged flasher lamp(s), the electrical relay being connected to the actuating element of the PTO drive assembly. In at least one embodiment, the control element is an air solenoid which is disposed in a pneumatic line between cab controls and an air shifter of the PTO drive assembly. Alternatively and according to at least one embodiment, the switch assembly can be used in conjunction with a motor vehicle system accessory or a console assembly, whether installed interior or exterior to the motor vehicle.

In one version, the air solenoid is integral to a housing of the switch assembly. In another version, the air solenoid is a separate component.

According to yet another aspect of the present invention, there is provided a method for preventing unauthorized operation of a power take off (PTO) drive assembly in a commercial motor vehicle, the method comprising: coupling an air solenoid in a pneumatic line of the PTO drive assembly between a cab control and an air shifter; and coupling a switch assembly between the hazard warning system of the motor vehicle and the air solenoid, the switch assembly including an electrical relay that is triggered only when a power signal is received from the hazard warning system indicating the at least one flasher lamp is energized.

According to at least one embodiment, the switch assembly further comprises a housing retaining the electrical relay. The air solenoid can be an integral part of the housing or alternatively, be provided as a separate component. Preferably, a capacitor is coupled in advance of the electrical relay and a diode is disposed in advance of the capacitor to smooth out intermittence of the power signal from the hazard warning system prior to reaching the electrical relay.

Advantageously, the present invention provides a safety and failsafe system for commercial motor vehicles that are equipped with PTO drive assemblies to prevent operation of the PTO drive assembly unless the hazard warning system, and more specifically the at least one flasher lamp(s) are operating at the same time. If the flasher lamps are disengaged, operation of the PTO drive assembly is immediately cut off.

The herein described invention can be inexpensively retrofitted into literally any existing commercial motor vehicle that is equipped with a PTO drive assembly. This retrofit can be performed without incurring significant costs for installation or impacting performance of the commercial motor vehicle, including the PTO drive assembly.

In addition, the herein described invention can be used on literally any power take off (PTO) drive assembly application, including those controlled manually, by cable, electric solenoid, gas assist, vacuum assist, air or hydraulic assist, battery, as well as those that are shaft driven or are directly coupled and which may further include a console assembly or an unfitted assembly that couples to the console assembly.

These and other features and advantages will be readily apparent from the following Detailed Description, which should be read in conjunction with the accompanying drawings.

DETAILED DESCRIPTION

The following relates to embodiments for a safety system for motor vehicles, preferably commercial motor vehicles such as tractors, vans, trucks and the like, each having power take-off (PTO) drive assemblies. The specific embodiments described herein relate to controlling an pneumatic flow circuit using an air solenoid that is disposed in a pneumatic line, such as between cab controls and an air shifter of the PTO drive assembly in order to prevent or permit operation of the PTO drive assembly. It will be readily apparent, however, that literally any other PTO drive assembly, such as those based on cab controls utilizing electrical, magnetic and/or vacuum, air, hydraulic assist means, among others, for engaging the PTO drive assembly can also be similarly equipped with safety features as described herein in which a control or actuating element is linked between cab or other controls and the PTO drive assembly and also coupled to the hazard warning system in accordance with the present invention.

In addition and throughout the following discussion, various terms such as "front", "rear", "distal", "proximal", "above", "below", "top" and "bottom", "inner" and "outer" are used in order to provide a suitable frame of reference in regard to the accompanying drawings. These terms, however, are not intended to limit or narrow the intended scope of the present invention, except where so specifically indicated herein.

The accompanying drawings are intended to convey the salient features of the present invention. Accordingly, the drawings are not necessarily made to scale and should not be relied upon by the reader for scaling purposes.

Figure 1:
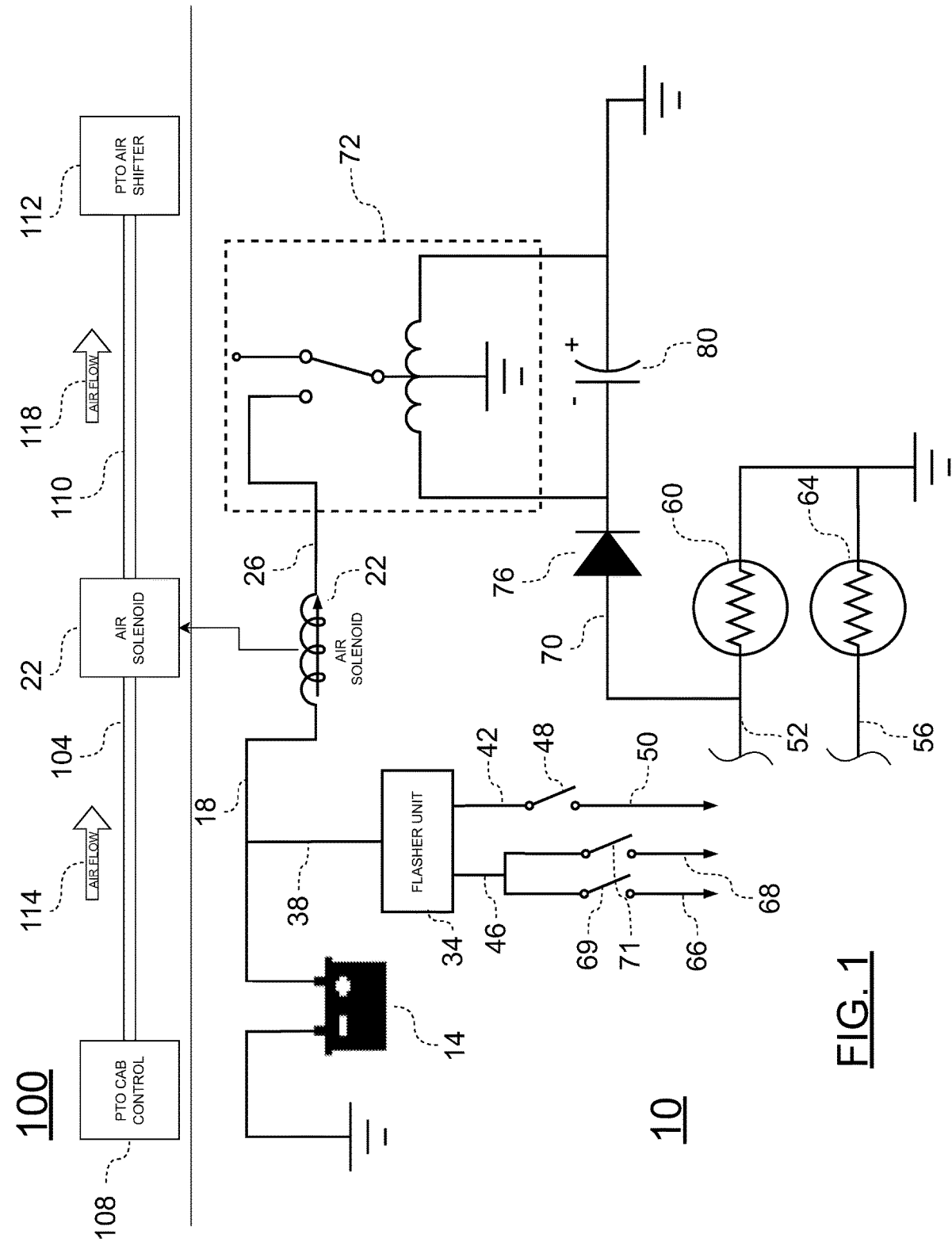
FIG. 1 is a schematic diagram of an exemplary safety system in accordance with a first embodiment of the present invention.

With reference to FIG. 1, a schematic diagram is shown in accordance with an exemplary embodiment that includes respective electrical and pneumatic circuits which are labeled as 10 and 100, respectively, for a PTO drive assembly or system. For purposes of this description, the PTO drive assembly and the herein described circuitry are used in a motor vehicle (not shown), and more specifically a commercial motor vehicle such as a truck, trailer or van.

In the electrical circuit 10, the battery 14 of the motor vehicle serves as a power source, which is coupled by a line 18 to an air solenoid 22 or similar air valve component. The air solenoid 22 is further disposed in relation to a pneumatic line 104 in the pneumatic circuit 100 linking the cab controls 108 of the PTO drive assembly with the input to the air solenoid 22 and another line 110 linking the output of the air solenoid 22 with a PTO air shifter 112. The remainder of the PTO drive assembly is not shown, but is conventional in terms of its design. The PTO drive assembly does not form an intended part of the present invention.

The electrical circuit 10 is coupled to a hazard warning system of the motor vehicle. The hazard warning system includes a conventional flasher unit 34, which is connected to the line 18 by means of a line 38. The flasher unit 34 is configured to generate an intermittent or pulsed electrical signal, which is transmitted through a line 42 to hazard warning lights 60, 64 and through a separate line 46 to the turning signals. A hazard warning circuit is activated by closing a switch 48 connected to the line 42. A line 50 leading from the switch 48 is connected in a conventional manner to lines 52 and 56, which are connected to the right side and left side hazard warning lamps, 60, 64, respectively. The flasher unit 34 according to this particular embodiment also is configured to control the turning signals via switches 69, 71 with respective lines 66, 68 extending from the switches 69, 71.

According to this specific embodiment, the electrical circuit 10 operatively couples the hazard warning system and the air solenoid 22. More specifically, a switch assembly may include a housing (shown in phantom) retaining a relay 72 made responsive to the operation of the hazard warning circuit by providing a line 70 from the flasher lamps 60, 64, which is connected to an electrical relay 72. Because the signal generated by the flasher unit 34 in the line 70 is intermittent/pulsed, a capacitor 80 is provided in the line 70 for purposes of providing a continuous signal to the relay 72. The relay 72 is connected to the line 70 across the capacitor 88. A diode 76 is also provided in order to smooth out the generated signal in the line 70 and in advance of the capacitor 80. The electrical relay 72 is further connected to a line 26 coupling same to the air solenoid 22.

In use and once the electrical relay 72 is triggered by the closing of the switch 42 of the hazard warning system, the triggering completes the circuit of the air solenoid 22, opening the air solenoid 22 and permitting pneumatic flow from the PTO cab control 108 to the PTO air shifter 112, as schematically shown along arrows 114, 118, and enabling use of the PTO drive system.

Contrarily and if the hazard lights 60, 64 are not operating; that is, the switch 48 is open, then the electrical relay 72 is not triggered and the air solenoid 22 is closed, which prevents air or hydraulic flow from the PTO cab control 108 to the PTO air shifter 112 and therefore prevents the PTO drive assembly from operating.

It will be understood that there are various modifications and variations that can be made in accordance with the present invention. For example and as shown in FIG. 2, the position of the air solenoid 22 can also be used to lock out all air controls in the cab by placing the air solenoid inline 111 of the air supply prior to the cab controls 108 as opposed to between the cab controls 108 and the air shifter 112 with air flow over lines 111 and 104 being shown by arrows 120 and 124, respectively, in a pneumatic circuit 100A.

Figure 2:
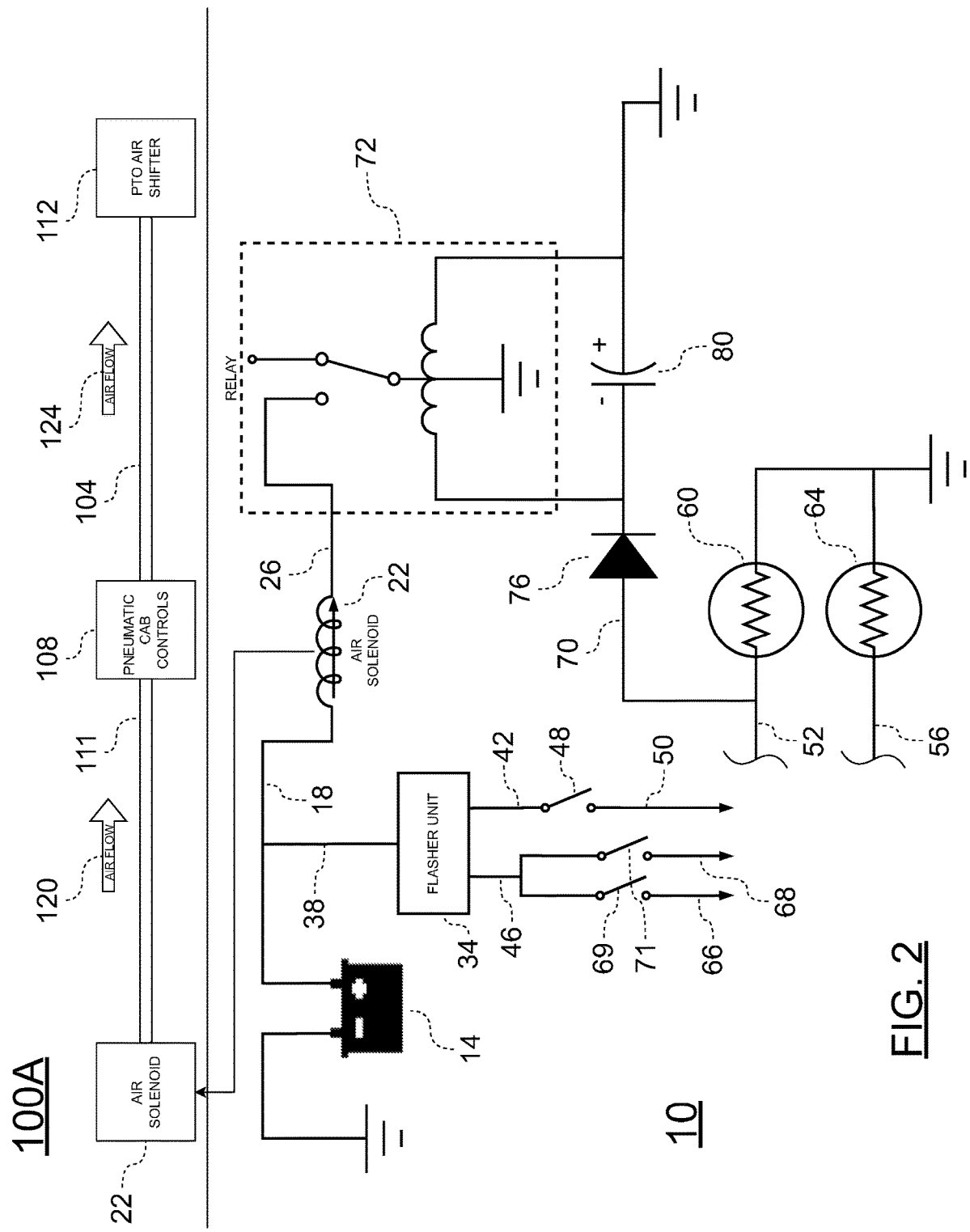
FIG. 2 is a schematic diagram of an exemplary safety system in accordance with a second embodiment.

The only difference in terms of operation between the embodiments depicted in FIGS. 1 and 2 is that of the positioning of the air solenoid 22. According to at least one embodiment, the air solenoid 22 can be provided as an integral part of the switch assembly housing or alternatively as a separate functioning component couplable to the air line.

The foregoing embodiments are specific to a PTO drive system or assembly that is reliant on air or fluid flow. It will be understood, however, that the safety system and more specifically the switch assembly can be suitably configured to any actuating or engaging component provided between the cab control and the PTO drive assembly in order to prevent operation of the PTO drive assembly when the hazard lights are not also operating at the same time. Moreover, a switch assembly as described herein that is couplable to the control element (e.g., air solenoid or other intermediate device) can be used as an aftermarket means for purposes of retrofitting in relation to an existing PTO drive assembly. Similarly, the herein described switch assembly having the electrical relay or similar means can be similarly introduced to a motor vehicle accessory or a console assembly, whether interior or exterior to the motor vehicle, vis a vis the hazard control system to prevent unauthorized use.

PARTS LIST FOR FIGS. 1-2

10 electrical circuit
14 battery
18 line
22 air solenoid
26 line
34 flasher unit
38 line
42 line
46 line
48 switch
50 line
52 line
56 line
60 flasher lamp
64 flasher lamp
66 line
68 line
69 switch, turning signal
70 line
71 switch, turning signal
72 relay
76 diode
80 capacitor
100 pneumatic circuit
100A pneumatic circuit
104 line
108 cab controls, PTO
110 line
111 line
112 PTO air shifter
114 arrow
118 arrow
120 arrow
124 arrow It will be understood that there are other variations and modifications of the invention that will be readily apparent to a person of appropriate skill reading this description and in accordance with the following claims.

The invention claimed is:

1. A safety system for a motor vehicle equipped with a power take-off (PTO) drive assembly and a hazard warning system including at least one flasher lamp powered by a battery of the motor vehicle, the safety system comprising:
an electrical circuit coupling the hazard warning system and an control element of the PTO drive assembly, wherein the control element is disabled to prevent operation of the PTO drive system unless the at least one flasher lamp is energized.

2. The safety system according to claim 1, wherein the control element of the PTO drive assembly comprises at least one air solenoid disposed in a pneumatic line between cab controls and an air shifter of the PTO drive assembly.

3. The safety system according to claim 2, wherein the electrical circuit includes an electrical relay coupled to the air solenoid and the hazard warning system, wherein the electrical relay is triggered only when the electrical relay receives an intermittent power signal from the hazard warning system.

4. The safety system according to claim 3, wherein the electrical circuit includes a switch assembly retaining the electrical relay.

5. The safety system according to claim 4, wherein the switch assembly comprises a housing and in which the air solenoid is part of or integral to the housing.

6. The safety system according to claim 2, wherein the electrical circuit further comprises a capacitor disposed in advance of the relay and a diode disposed in advance of the capacitor for smoothing out the intermittent power signal from the hazard warning system.

7. A switch assembly configured for connection to an actuating element of a power take-off (PTO) drive assembly of a commercial motor vehicle or motor vehicle system accessory, the switch assembly being coupled to a hazard warning system of the motor vehicle including at least one flasher lamp, wherein the switch assembly comprises:
an air solenoid that is configured to be coupled to a pneumatic line of the PTO drive assembly; and
an electrical relay further coupled to the air solenoid, the electrical relay being triggered to enable operation of the air solenoid only if the relay receives a power signal indicating the at least one flasher lamp is energized.

8. The switch assembly according to claim 7, wherein the air solenoid is integral to or attached to a housing of the switch assembly.

9. The switch assembly according to claim 8, in which the air solenoid is disposed between cab controls and an air shifter of the PTO drive assembly.

10. The switch assembly according to claim 7, wherein a capacitor is disposed in advance of the electrical relay and a diode is disposed in advance of the capacitor to smooth out an intermittent power signal from the hazard warning system.

11. The switch assembly according to claim 8, wherein the switch assembly is configured to be coupled to a console assembly of the motor vehicle or to an upfitted accessory controls console assembly.

12. The switch assembly according to claim 8, wherein the switch assembly is configured for attachment in either the interior of the motor vehicle or exterior of the motor vehicle.

13. A method for preventing unauthorized operation of a power take off (PTO) drive assembly in a commercial motor vehicle, the method comprising:
coupling a control element in relation to cab controls and the PTO drive assembly; and
coupling a switch assembly between the hazard warning system of the motor vehicle and the control element, the switch assembly including an electrical relay that is triggered only when an intermittent power signal is received from the hazard warning system indicating the at least one flasher lamp is energized.

14. The method according to claim 13, wherein the switch assembly further comprises a housing retaining the electrical relay.

15. The method according to claim 13, further comprising coupling a capacitor in advance of the electrical relay and a diode in advance of the capacitor to smooth out the intermittent power signal from the hazard warning system prior to reaching the electrical relay.

16. The method according to claim 13, wherein the control element is an air solenoid, the method comprising coupling the air solenoid in relation to a pneumatic line between the cab controls and an air shifter of the PTO drive assembly.

17. The method according to claim 16, wherein the air solenoid is an integral part of a switch assembly housing.

18. The method according to claim 16, wherein the air solenoid is separate from the switch assembly.

* * * * *